United States Patent Office 3,270,030
Patented August 30, 1966

3,270,030
CERTAIN ALKYLTHIOOXADIAZOLYL-ANTHRAQUINONE DYES
Hans Weidinger, Limburgerhof, Pfalz, and Heinz Eilingsfeld and Leander Moebius, Ludwigshafen (Rhine), Germany, assignors to Badische Anilin- & Soda-Fabrik Aktiengesellschaft, Ludwigshafen (Rhine), Germany
No Drawing. Filed July 13, 1965, Ser. No. 471,705
Claims priority, application Germany, July 21, 1964, B 77,769; Apr. 17, 1965, B 81,512, B 81,513
4 Claims. (Cl. 260—307.5)

This invention relates to new anthraquinone dyes which have the general formula

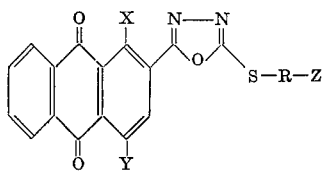

(I)

in which X denotes an amino or methylamino group, Y denotes an amino or alkylamino group with up to 4 carbon atoms, and R denotes a linear or branched alkyl radical with up to 8 carbon atoms and Z denotes a hydrogen atom, a cyano group, a methoxy group or a carbalkoxy group.

On account of their good fastness properties, particularly their excellent light and thermal fastness, the new dyes lend themselves admirably to dyeing and printing synthetic textile materials, such as fibers, threads, filaments, flock, woven fabrics and knitted fabrics of plastics such as polyamide, polyurethanes, acetate and especially polyesters.

Examples of dyes having the general Formula I are the following compounds:

| | —X | —Y | —Z |
|---|---|---|---|
| 1 | —NH$_2$ | —NH$_2$ | —C$_2$H$_5$ |
| 2 | —NH$_2$ | —NH$_2$ | —CH$_2$—CH$_2$—CH$_2$—CN |
| 3 | —NH$_2$ | —NH$_2$ | —CH$_2$—CH$_2$—COOC$_2$H$_5$ |
| 4 | —NH$_2$ | —NH$_2$ | —(CH$_2$)$_7$CH$_3$ |
| 5 | —NH$_2$ | —NH—C$_4$H$_9$ | —CH$_3$ |
| 6 | —NH—CH$_3$ | —NH$_2$ | —C$_2$H$_5$ |
| 7 | —NH$_2$ | —NH$_2$ | —CH(CH$_3$)$_2$ |
| 8 | —NH$_2$ | —NH$_2$ | —CH$_2$—CH$_2$—OCH$_3$ |
| 9 | —NH$_2$ | —NH$_2$ | —CH$_3$ |
| 10 | —NH$_2$ | —NH$_2$ | —C$_6$H$_5$ |
| 11 | —NH$_2$ | —NH$_2$ | CH$_2$—CH$_2$—CH$_2$—CH$_3$ |
| 12 | —NH$_2$ | —NH$_2$ | —CH$_2$—CH(CH$_3$)$_2$ |

The new dyes can be produced for example by reacting the appropriate anthraquinone carboxylic hydrazide, which may contain a nitro group in 4-position of the anthraquinone radical if desired, in a solvent such as N-methylpyrrolidone with a mercapto formamide chloride having the formula

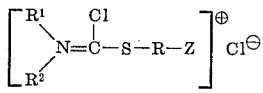

in which $R^1$ and $R^2$ denote unsubstituted or substituted alkyl radicals or unsubstituted or substituted aryl radicals, and R and Z have the meanings given above, and if 4-nithroanthraquinone compounds are used, by reducing the nitro group to an amino group.

Examples of mercapto formamide chlorides which can be used as starting materials are:

N,N-dimethylmethylmercapto formamide chloride, N-methyl - N - methoxymethylmethylmercapto formamide chloride, N - methyl - N - cyanoethylmethyl-mercapto formamide cholride, N - methyl - N - β - carbomethoxy-ethylmercapto formamide chloride, N - methyl - N - phenylmethylmercapto formamide chloride, N - N - pentamethylene methylmercapto formamide chloride, N,N - pentamethylene ethylmercapto formamide chloride, N,N - pentamethylene - n - butylmercapto formamide chloride, N,N - pentamethylene - β - carbomethoxyethylmercapto formamide chloride, N,N-pentamethylene-β-cyanoethylmercapto formamide chloride, N,N-pentamethylene-γ-cyanopropylmercapto formamide chloride, N - methyl-N-(4-cyanophenyl)-methylmercapto formamide chloride, N-methyl - N - (4 - methylphenyl)-methylmercapto formamide chloride, N,N-diphenyl-n-butylmercapto formamide chloride and N-morpholyl methylmercapto formamide chloride. These mercapto formamide chlorides can be easily prepared for example by the process described in Belgian Patent 660,941 from N,N-distubstituted dithiocarbamic esters and chlorinating agents.

The reaction of the carboxylic hydrazides with the mercapto formamide chlorides takes place in a solvent or diluent at temperatures from —20° to 120° C., preferably at 0° to 80° C. Examples of suitable solvents are: dimethylformamide, N-methylpyrrolidone, pyridine or hydrocarbons, such as benzene and toluene, or alcohols, such as methanol and ethanol. Mixtures of the said solvents may also be used.

It is advantageous to use those mercapto formamide chlorides which are disubstituted on the nitrogen atom by two equal, low molecular weight alkyl radicals or the pentamethylene radical.

The starting materials may be allowed to react with one another in equimolecular amounts but it is advantageous to use an excess of mercapto formamide chloride for example 1.2 moles per mole of carboxylic hydrazide.

The process may be carried out by stirring for some hours at the reaction temperature a mixture of the carboxylic hydrazide and the mercapto formamide chloride in the reaction medium necessary for the manufacture of the desired 1,3,4-oxdiazol. In some cases it is advantageous not to add the mercapto formamide chloride to the mixture of carboxylic hydrazide and solvent until the reaction temperature has been reached, if desired by cooling. A particularly advantageous method of operation consists in allowing the mercapto formamide chloride the form from the corresponding dithiocarbamic ester having the general formula

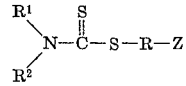

in which R, R¹, R² and Z have the meanings given above, and a chlorinating agent in the reaction vessel.

The 1,3,4-oxidazols separate off from the reaction mixture, part of them even while hot. They are filtered off at room temperature, if desired after diluting with water and an addition of alkali or methanol, washed and dried.

The new dyes can also be obtained by converting the said hydrazides to the corresponding oxidazol compounds with carbon disulphide and then alkylating the mercapto group with alkylating agents which yields the —R—Z radical mentioned above.

The anthraquinone carboxylic hydrazides are reacted with carbon disulphide in a solvent or diluent and in the presence of an alkaline reacting agent at $-20°$ to $100°$ C., preferably at $20°$ to $70°$ C. At least molar amounts are used preferably 1.1 to 2 times the molar amount of carbon disulphide, with reference to the amount of hydrazide. Examples of suitable solvents or diluents are water, acetone and alcohols, such as dioxane and N-methylpyrrolidone.

Sodium hydroxide or trialkylamines, for example, may be used as alkaline reacting agents. Mixtures of the said compounds may also be used as solvents and alkaline reacting agents.

Alkylating agents which yield the said radical —R—Z are added to the reaction mixture simultaneously or preferably subsequently. Examples of such alkylating agents are: dimethyl sulphate, diethyl sulphate, p-toluenesulphonic acid methyl ester, n-butyl bromide, isobutyl bromide, 1,5-dibromopentane, 1-chloro-2-methoxyethane, γ-chlorobutyronitrile, 1-chloro-2-dimethylaminoethane, α-chloroacetamide, ε-chlorocaproic piperidine, ε-chlorocaproic anilide, allyl chloride or propargyl chloride. Mixtures of these alkylating agents may also be used. In this case dye mixtures are obtained.

If 4-nitroanthraquinone carboxylic hydrazides are used as the starting material in the process according to the invention the nitro group is reduced to an amino group. However since this reduction often does not proceed quantitatively and in such cases mixtures of the amino compound and the nitro compound are obtained as reaction products it is recommended that, if desired, the reduction be completed by an after-treatment with reducing agents. For example sodium sulphide, sodium dithionite or hydrazine is used for a reductive after-treatment of this kind.

Another method of manufacturing the new dyes having the general Formula I is to react the appropriate anthraquinone-2-carboxylic chlorides with dithiocarbazic acid esters having the general formula $$H_2N—NH—CS—S—R—Z$$

in which Z and R have the meanings given above. This reaction leads to oxdiazol cyclization when carried out in alkaline solvents such as N-methylpyrrolidone, pyridine, quinoline or dimethyl formamide at temperatures between $70°$ and $120°$ C.

Polyester and polyamide materials may take the form, for example, of sheets, films or textile materials such as fibers, threads, flock, woven fabrics or knitted fabrics of these substances. Example of polyesters are products obtained from terephthalic acid and ethylene glycol or α-dimethylolhexane and examples of polyamides are products obtained from ε-caprolactam or hexamethylenediamine and adipic acid.

Dye liquors containing the dyes advantageously in finely divided form are used for dyeing. Polyester textile material may be dyed with these liquors for example at temperatures between $95°$ and $100°$ C. at atmospheric pressure and at temperatures over $100°$ C. according to the high temperature process or the thermosol process. If strong colorations are desired at temperatures about $100°$ C. it is advantageous to add carriers, such as aromatic carboxylic acids or aromatic halogen compounds, to the dye liquor. Polyamides are advantageously dyed in the presence of small amounts of a carrier. An example of a carrier is the product obtained when 1 mole of castor oil is reacted with 40 moles of ethylene oxide.

Print pastes containing the said dyes in finely divided form in addition to the conventional thickening agents and printing assistants are used for the printing of polyester and polyamide textile material. It is advantageous to add carriers to the print pastes as well. After printing the material is steamed and finished off in the conventional way.

The dyeings and prints obtained with the dyes according to the invention are distinguished by their good thermal fastness and their good fastness to light and crocking. Particularly good tinctorial results are obtained when mixtures of the dyes according to the invention are used.

The invention is further illustrated by the following examples in which parts are parts by weight.

Example 1

66 parts of 1-amino-4-nitroanthraquinone-2-carboxylic hydrazide is reacted with 54 parts of N,N-pentamethylene methylmercapto formamide chloride in 750 parts of N-methylpyrrolidone for five hours at $60°$ C. The precipitate is filtered off after cooling, washed with methanol and dried. 56 parts of a compound having the formula

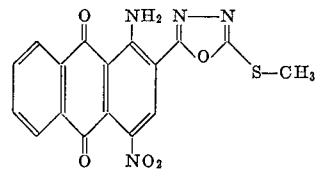

is obtained as red crystals with a melting point of $280°$ to $282°$ C. The diamine obtained after the nitro group has been reduced with sodium sulphide melts at $255°$ C. and dyes linear polyamide or polyester articles blue shades.

Proceeding as described in this example but using those N,N-dialkyl alkylmercapto formamide chlorides which contain the alkylmercapto radicals indicated in the following table dyes are obtained with similar properties and the melting points shown in the table:

| Alkyl mercapto radical | Melting point of the dye (° C.) |
|---|---|
| —S—C₂H₅ | 228 |
| —S—CH₂—CH₂—COOC₂H₅ | 180 |
| —S—CH₂—CH₂—OCH₃ | 230 |
| —S—CH(CH₃)₂ (isopropyl) | 185–187 |
| —S—CH₂—CH(CH₃)₂ (isobutyl) | 186–188 |
| —S—(CH₂)₇CH₃ | 190–193 |

The method described below can also be used to prepare the above mentioned intermediate:

189 parts of N,N-dimethyldithiocarbamic acid dimethyl ester is dissolved in 3,000 parts of dry ethylene dichloride and to this 125 parts of phosgene is introduced at a temperature of $20°$ to $25°$ C. The reaction mixture is allowed to stand for one hour at the same temperature. Then 326 parts of 1-amino-4-nitroanthraquinone-2-carboxylic hydrazide is added, the whole is stirred for one hour at $50°$ C. and for three hours under reflux. There is a yield of 380 parts.

Example 2

A mixture of 32.6 parts of 1-amino-4-nitroanthraquinone-2-carboxylic hydrazide, 200 parts of N-methylpyrrolidone and 32 parts of N,N-pentamethylene-n-butylmercapto formamide chloride is stirred for four hours at 65° C. The precipitate is filtered off after cooling, washed with methanol and dried. 35 parts of a compound having the formula

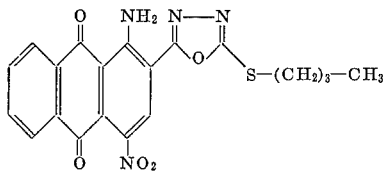

is obtained as red crystals with a melting point of 225° C. to 228° C. The diamine obtained after the nitro group has been reduced by sodium sulphide melts at 200° to 210° C. and dyes linear polyamide and polyester articles brilliant blue shades.

*Example 3*

29 parts of 1-aminonitroanthraquinone-2-carboxylic hydrazide is reacted with 25 parts of N,N-pentamethylene cyanopropylmercapto formamide chloride in 90 parts of N-methylpyrrolidone for three hours at 65° C.

The precipitate is filtered off after cooling, washed with methanol and dried. 24.5 parts of a compound having the formula

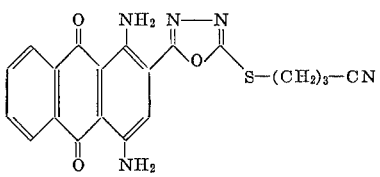

is obtained as red crystals with a melting point of 230° to 233° C. The dye dyes linear polyamide and polyester textile material blue shades.

*Example 4*

A mixture of 9 parts of 1,4-diaminoanthraquinone-2-carboxylic hydrazide, 40 parts of dimethylformamide and 9 parts of N,N-pentamethylene-β-carbomethoxyethylmercapto formamide chloride is stirred for five hours at 60° C. The precipitate is filtered off after cooling, washed with methanol and dried. 8.7 parts of a compound having the formula

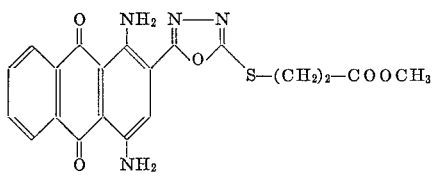

is obtained as dark blue crystals with a melting point of 195° to 198° C. (with decomposition). The compound dyes linear polyamide or polyester articles blue shades.

*Example 5*

26 parts of 1-amino-4-nitroanthraquinone-2-carboxylic hydrazide is reacted with 23 parts of N,N-pentamethylenecyclohexylmercapto formamide chloride in 150 parts of N-methylpyrrolidone for four hours at 65° C. The precipitate is filtered off after cooling, washed with methanol and dried. 22.5 parts of a compound having the formula

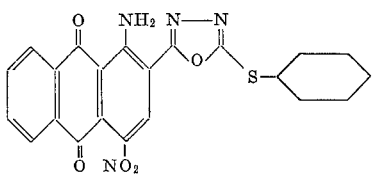

is obtained as red crystals with a melting point of 242° to 244° C. The corresponding diamine obtained after the nitro group has been reduced by sodium sulphide melts at 190°–192° C., and dyes linear polyamide and polyester articles blue shades.

*Example 6*

A mixture of 16.3 parts of 1-amino-4-nitroanthraquinone-2-carboxylic hydrazide, 200 parts of water, a few drops of wetting agent, 4 parts of sodium hydroxide and 4.5 parts of carbon disulphide is mixed for 30 minutes at 25° to 30° C. Then 6.9 parts of dimethyl sulphate is dripped in at 40° C. in the course of an hour and the mixture is maintained at this temperature for a further five hours. After cooling the mixture is suction filtered and the filtrate washed and dried. 16 parts of a compound is obtained which, after being reduced with sodium sulphide, has the formula

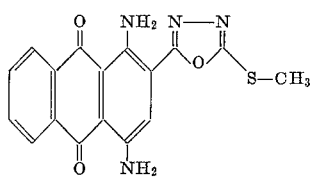

The dye dyes polyester and polyamide clear blue shades. The colorations exhibit high fastness to light and to dry-heat pleating and setting.

*Example 7*

100 parts of polyethylene terephthalate woven fabric is treated for 90 minutes at 135° C. in a dye liquor consisting of 5,000 parts of water, 2 parts of a compound obtained by reacting 1 mole of sperm alcohol with 80 moles of ethylene oxide and by subsequent sulphonation, and 1 part of a finely divided dye indicated in the table given above. Blue and violet colorations of high tinctorial strength are obtained with good to very good fastness properties.

Colorations of particularly high tinctorial strength are obtained when dyeing is carried out with mixtures of these dyes, for example with a mixture containing dyes 9 to 11 of the table in the ratio 1:1.

*Example 8*

100 parts of polyethylene terephthalate woven fabric is treated for 90 minutes at 100° C. in a dye liquor consisting of 3,000 parts of water, 9 parts of finely divided p-phenylphenol and 2 parts of a finely divided dye indicated in the table.

The dyed fabric is washed with water and then treated for 15 minutes at 85° C. in a liquor consisting of 3,000 parts of water, 3 parts of sodium dithionite and 3 parts of a 32% caustic soda solution; then it is washed with water again. Dyes analogous to those in Example 1 are obtained.

*Example 9*

A polyethylene terephthalate woven fabric is printed with a print paste consisting of 20 parts of diisobutyl phosphate, 15 parts of a mixture of the sodium salts, of the disulphonimides of those hydrocarbons which contain an average of 10 carbon atoms in the molecule, 650 parts of crystal gum, 275 parts of water and 40 parts of dye No. 9 in the table.

After being dried the fabric is steamed for 30 minutes at a pressure of 1.5 atmospheres gauge. A print is obtained of high tinctorial strength with good to very good fastness properties.

*Example 10*

100 parts of a polyamide woven fabric is treated for an hour at 95° to 100° C. in a dye liquor consisting of 5 parts of a compound obtained by reacting 1 mole of sperm alcohol with 80 moles of ethylene oxide and by subsequent sulphonation, and 1 part of a mixture of equal parts of dyes 9 and 11 in the table. The dyed fabric is rinsed with hot water. A blue coloration of high tinctorial strength is obtained.

We claim:
1. Dyes having the formula

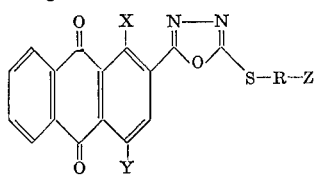

in which X denotes an amino or a methylamino group, Y denotes an amino or an alkylamino group with up to 4 carbon atoms, R denotes a linear or branched alkyl radical with up to 8 carbon atoms and Z denotes a hydrogen atom, a cyano group, a methoxy group or carbalkoxy group.

2. The dye having the formula

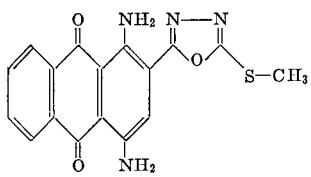

3. The dye having the formula

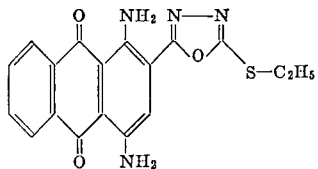

4. The dye having the formula

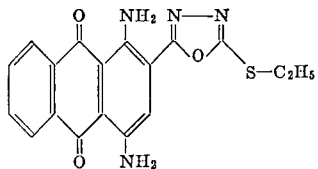

No references cited.

HENRY R. JILES, *Primary Examiner.*

R. J. GALLAGHER, *Assistant Examiner.*

UNITED STATES PATENT OFFICE
CERTIFICATE OF CORRECTION

Patent No. 3,270,030          August 30, 1966

Hans Weidinger et al.

It is hereby certified that error appears in the above numbered patent requiring correction and that the said Letters Patent should read as corrected below.

Column 2, line 8, for "nithro" read -- nitro --; column 3, line 32, for "piperidine" read -- piperidide --.

Signed and sealed this 5th day of September 1967.

(SEAL)
Attest:

ERNEST W. SWIDER
Attesting Officer

EDWARD J. BRENNER
Commissioner of Patents